United States Patent [19]

Morane

[11] Patent Number: 5,054,651
[45] Date of Patent: Oct. 8, 1991

[54] METHOD OF PACKAGING UNDER PRESSURE OF A FLUID, USING A SYSTEM OF FERMENTATION CREATING A PROPULSIVE GAS

[75] Inventor: Bruno Morane, Neuilly, France
[73] Assignee: L'Oreal, Paris, France
[21] Appl. No.: 609,367
[22] Filed: Nov. 5, 1990

Related U.S. Application Data

[62] Division of Ser. No. 263,358, Oct. 27, 1988, Pat. No. 5,009,340.

[30] Foreign Application Priority Data

Oct. 30, 1987 [FR] France .................................. 87 15050

[51] Int. Cl.⁵ ............................................... B67B 7/00
[52] U.S. Cl. .......................................... 222/1; 222/399; 435/171; 435/287; 435/300; 435/940
[58] Field of Search ................. 222/1, 94, 105, 106, 222/130, 386.5, 396, 399, 389; 435/171, 940, 287, 300

[56] References Cited

U.S. PATENT DOCUMENTS

| | | | |
|---|---|---|---|
| 3,023,750 | 3/1962 | Baron | 222/386.5 X |
| 4,202,470 | 5/1980 | Fujii | 222/386.5 X |
| 4,203,440 | 5/1980 | Theeuwes | 222/386.5 X |
| 4,203,441 | 5/1980 | Theeuwes | 222/386.5 X |
| 4,478,044 | 10/1984 | Magid | 222/386.5 X |
| 4,556,156 | 12/1985 | Frutin | 222/386.5 |
| 4,867,344 | 9/1989 | Bitterly | 222/389 X |

FOREIGN PATENT DOCUMENTS 2229241 11/1974 France .

Primary Examiner—Michael S. Huppert
Assistant Examiner—Gregory L. Huson
Attorney, Agent, or Firm—Cushman, Darby & Cushman

[57] ABSTRACT

In a packaging container (1a) provided with a distribution valve (7), a chamber is provided enclosing the starting components of a system (9) for the anaerobic fermentation of sugars using yeasts, which produce the carbon gas forming said propulsive product. The chamber is composed either of a flexible, gas-tight, hermetically closed pocket (8) or of a small rigid reservoir, which is normally closed by a valve calibrated to open only when the pressure which is established in said reservoir exceeds by a given value the pressure reigning in the interior space of the packing container.

7 Claims, 3 Drawing Sheets

METHOD OF PACKAGING UNDER PRESSURE OF A FLUID, USING A SYSTEM OF FERMENTATION CREATING A PROPULSIVE GAS

CROSS REFERENCE TO RELATED APPLICATION

This is a division of application Ser. No. 07/263,358, filed Oct. 27, 1988 now U.S. Pat. No. 5,009,340.

FIELD OF THE INVENTION

The present invention relates to a method and to a container for packing under pressure of a liquid or pasty fluid, with said fluid being placed and distributed under pressure by means of a propulsive gas.

BACKGROUND OF THE INVENTION

The fluids capable of being distributed in this manner are, generally, cosmetic products, in particular in the field of body care, such as deodorants, hair care products, like lacquer; home care products, such as insecticides and air fresheners; as well as certain pharmaceutical products. Depending on use, the distribution is in the form of creams, mousses, liquid or aerosol sprays.

The most frequently used propulsive products are chlorofluorinated hydrocarbons, known by the trade name "Freon" and sold by Du Pont de Nemours, for example dichlorodifluoromethane.

However, for safety reasons, both during manufacture and before and during use and for reasons of the fight against atmospheric pollution, the use of these propulsive gases, in particular that of the "Freons", is, at the present time, limited or prohibited by the laws of different countries, which poses the problem of discovering new means for ensuring the distribution of the fluids packed in this manner under pressure. In addition, even in the absence of a law prohibiting their use, there is sometimes the problem of preventing the contact of these propulsive gases with the product to be distributed, for reasons of quality or of conformity of said product.

DESCRIPTION OF THE PRIOR ART

As a propulsive gas, it has already been proposed to use the carbon gas created within the packing container by the following chemical reaction:

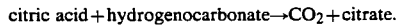
citric acid + hydrogenocarbonate → $CO_2$ + citrate.

However, the in situ operation of this chemical reaction has serious disadvantages on the practical side.

French Patent FR-A-2 283 204 has also proposed preparing the carbon gas by introducing into the product to be distributed microorganisms capable of causing a fermentation, with release, into the container, of carbon gas. The fermentation therefore takes place in the product to be distributed, at the expense of the product to be distributed. This method has the following disadvantages: certain components of the product to be distributed can only be introduced after stabilization of the pressure, since they would be likely to harm the development of the microorganisms. This is the case, for example, with perfumes; of compositions comprising a non-aqueous support such as oil, highly concentrated alcohol or silicone oil; preserving agents which have a germicidal action; antiperspirant agents which are aluminum hydrochlorates; anti-dandruff agents, quaternary ammonium, reducing agents (for example, thioglycolic acid in permanents) or oxidizing agents (for example $H_2O_2$ in tints); nitrate or reactive coloring agents. Moreover, during fermentation, the product, by the action of $CO_2$, becomes too acid for cosmetic use, for example, and it is necessary to add an alkaline agent after fermentation. These subsequent additions necessitate providing the container under pressure with a complicated introduction device. In addition, it has been noted that the fermentation of sugars using microorganisms produces a carbon gas which contains bad odors. Consequently, its presence in many compositions, in particular in cosmetic compositions, is disagreeable. Furthermore, the direct contact of the fluid to be distributed with the propulsive carbon gas can lead to the formation of mousse when the fluid contains a tensio-active agent, for example.

SUMMARY OF THE INVENTION

The present invention relates to a method for packing a fluid which enables these disadvantages to be overcome.

The object of the present invention is firstly a method for packing under pressure a liquid or pasty fluid intended to be distributed from a packing container provided with a distribution valve, with said fluid to be distributed being placed under pressure by means of a propulsive gas, in accordance with which method the propulsive gas is a carbon gas obtained by anaerobic fermentation of a fermentation system containing sugars, using yeasts, with the components of said fermentation system being selected qualitatively and quantitatively such that the carbon gas produced creates, inside the packing container, a pressure capable of ensuring the distribution of the fluid through said valve, wherein the fermentation system is contained in a chamber provided inside the container.

Both simple sugars, such as glucose, and complex sugars, such as saccharose, can be used as the sugars in the fermentation system.

Generally, the yeasts which are used are those which are the most likely to transform the sugars to alcohol and to carbon gas in the selected reaction medium, which in particular is an aqueous medium, with said yeasts preferably being those belonging to the Saccharomyces genus.

It can also be useful to add to the starting components of the fermentation system at least one doping agent, preferably selected from among the vitamins, such as biotine (vitamin H) and thiamine (vitamin B).

In accordance with a first embodiment of the present invention, the fermentation system is completely isolated from the fluid product to be distributed. As the chamber in which the starting components of the fermentation system are placed, a flexible pocket is preferably used, which is sealed to the gases and which is hermetically closed, with said flexible pocket being such that, once totally inflated, it is capable of occupying an area at least equal to the internal area of the packing container. These flexible pockets are, for example, those described in FR-B-2 229 241 and FR-A-87-08605. This system enables distribution of both the liquids and the pasty products with a viscous consistency, such as creams and gels.

In accordance with a second embodiment of the present invention which is particularly suited to the distribution of liquid substances, a small rigid reservoir is used as the chamber in which the starting components of the fermentation system are placed, said reservoir normally being closed by a valve which is calibrated to open only when the pressure which is established in said reservoir exceeds by a given amount that reigning in the interior space of the packing container, with said reservoir being ballasted so that the liquid phase of the fermentation system is always beneath said valve, whatever the position of the packing container.

An adjustable valve can also be used so that the pressure reigning in the container is always substantially equal to a modifiable predetermined value.

In accordance with this embodiment, all the components of the fermentation system are isolated from the fluid product to be distributed except for the carbon gas which can spread over and through the fluid and pressurize it. Such a system is preferably used for distribution in the form of aerosols or products containing compounds likely to harm the development of the microorganisms but in which bad odors and the acidifying action of the carbon gas are not detrimental. Among such compounds, insecticides may be cited, for example.

In accordance with this second embodiment, the rigid container may also be introduced in a flexible hermetically closed envelope. In this manner, contact between the carbon gas and the distributed product can be prevented, while at the same time the advantage of being able to adjust the pressure in the container is retained.

The starting components of the fermentation system can also be placed in the lower chamber of a container containing an upper chamber filled with the fluid to be distributed, which is separated from the lower chamber by a piston, with the released carbon gas then exerting pressure, going from the bottom to the top, on the lower surface of the piston, which tends to cause the distribution of the packed fluid through the valve with which the container is provided by reduction of the volume of the upper chamber.

The experiments described below illustrate the possibilities offered by the present invention to adjust the pressure to a desired value, which can go up to approximately 12 bars.

GENERAL METHOD

An aqueous solution of sugar, yeast and, as appropriate, a doping agent composed of biotine was placed in identical flexible pockets produced in a two-layer aluminum-polyethylene complex having a volume on the order of 220 cm$^3$. The quantities of the sugar solution, the concentration of the sugar and the quantities of yeast and doping agent, which varied from one test to another, are given in the following Tables I and II, which relate, respectively, to the use, as the sugar, of saccharose and glucose. Each pocket was then hermetically closed and each was arranged in the exterior envelope of an "aerosol can" type container having a capacity of 200 cm$^3$, which was filled to 75% with alcoholized water. The container was then closed with a cap fitted with its distribution valve, as will be described in more detail below in reference to FIGS. 1 to 3.

For each container, the pressure of the carbon gas was measured as a function of the time, as is also shown in Tables I and II. As a general rule, after a period of time on the order of 144 hours, the final pressure was reached.

It can also be noted, from Tables I and II, that the doping agent enabled a lesser amount of yeast to be used in order to obtain a same pressure.

TABLE I

| Starting composition of the reaction system. | | | CO$_2$ pressure in bars after fermentation for | | | |
|---|---|---|---|---|---|---|
| Quantity of saccharose solution (g) (Concentration of saccharose (g/l)) | Yeast (g) | Doping agent (g) | 15 h | 42 h | 72 h | 144 h |
| 12 (200) | 1.3 | 1.5 | 5.3 | 9.0 | 10.8 | >11.8 |
| 12 (300) | 1.5 | 0 | 2.3 | 4.3 | 5.7 | 8.8 |
| 12 (300) | 3 | 0 | 3.7 | 6.5 | 8.0 | 11.8 |
| 16 (200) | 1.5 | 0 | 2.9 | 3.8 | 5.0 | 7.8 |
| 16 (200) | 1.5 | 1.5 | 5.4 | 9.2 | >11.3 | >11.8 |

TABLE II

| Starting composition of the reaction system | | | CO$_2$ pressure in bars after fermentation for | | | | | |
|---|---|---|---|---|---|---|---|---|
| Quantity of glucose solution (g) (Concentration of glucose (g/l)) | Yeast (g) | Doping agent (g) | 15 h | 20 h | 42 h | 48 h | 72 h | 144 h |
| 12 (200) | 1 | 0 | | | 2.1 | 3.2 | 4.4 | 6.4 |
| 12 (200) | 1.5 | 0 | | | 3.1 | 4.3 | 5.9 | 8.3 |
| 12 (200) | 1 | 1 | | | 4.8 | 6.9 | 8.1 | 9.7 |
| 12 (200) | 1.5 | 1.5 | | | 5.6 | 8.1 | 9.1 | 10.3 |
| 16 (200) | 1 | 0 | | | 1.8 | 3.1 | 4.3 | 6.9 |
| 16 (200) | 1.5 | 0 | | | 2.6 | 4.3 | 5.4 | 8.4 |
| 16 (200) | 1 | 1 | | | 5.9 | 9.0 | >10.8 | >11.8 |
| 16 (200) | 1.5 | 1.5 | | | 6.5 | 9.6 | >11.8 | >11.8 |
| 16 (200) | 3 | 3 | | | 7.6 | 9.3 | >10.8 | >11.8 |
| 9 (300) | 1.5 | 0 | 1.8 | 3.2 | | | 3.9 | 5.9 |
| 9 (300) | 1.5 | 1.5 | 1.8 | 7.8 | | | 8.8 | 10.5 |
| 14 (200) | 1.5 | 1.5 | 3.5 | 7.6 | | | 8.8 | 10.8 |
| 12 (300) | 1.5 | 0 | 2.2 | 4.1 | | | 5.1 | 7.5 |
| 12 (300) | 3 | 0 | 3.4 | 5.9 | | | 7.3 | 9.2 |
| 24 (200) | 3 | 0 | 2.9 | 5.7 | | | 6.9 | 10.0 |

The object of the present invention is also a container for packing under pressure a liquid or pasty fluid, provided with a distribution valve, with said fluid to be distributed being placed under pressure by means of a propulsive gas composed of carbon gas obtained by anaerobic fermentation of a fermentation system containing sugars, using yeasts, with the components of said fermentation system being selected qualitatively and quantitatively so that the carbon gas produced creates a pressure inside the packing container which is capable of ensuring the distribution of the fluid through said valve, wherein the fermentation system is contained in a chamber arranged inside the container.

In accordance with a first embodiment, the chamber is composed of a flexible, gas-tight, hermetically closed pocket, with the internal free volume of said pocket in the inflated state being at least equal to the interior volume of the container.

In accordance with a second embodiment, the chamber is composed of a small rigid reservoir which is normally closed by a calibrated valve, opening only when the pressure in said reservoir exceeds by a given value the pressure reigning in the interior space of the packing container, with said reservoir being ballasted so that the liquid phase of the fermentation system is always beneath said valve, whatever the position of the packing container.

In accordance with an alternative of said second embodiment, the rigid container is placed into a hermetically closed, flexible envelope.

The relative pressure exerted on the fluid to be distributed is generally between approximately 2 and 8 bars.

To better understand the object of the present invention, described below, as purely illustrative and non-limiting examples, are two embodiments shown in the attached figures.

DETAILED DESCRIPTION OF THE INVENTION

Figure 1:
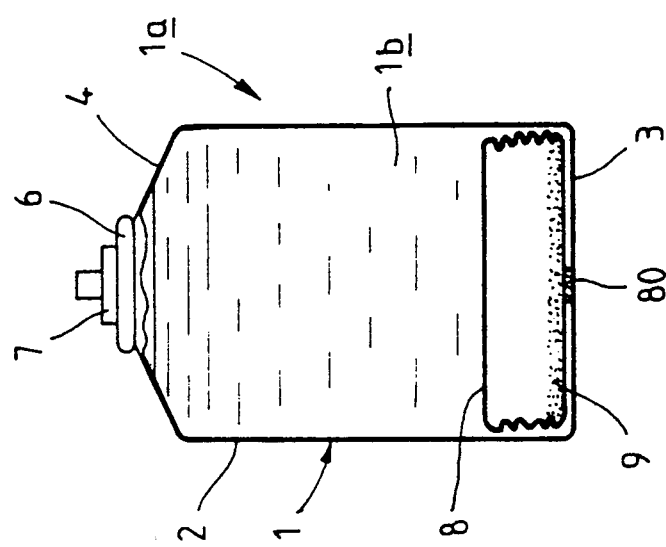
FIG. 1 shows an axial schematic cross-section of a packing container in accordance with a first embodiment, after the introduction of a flexible pocket inside which the starting products of the carbon gas-producing fermentation system are located and before the introduction of the fluid to be distributed.
Figure 2:
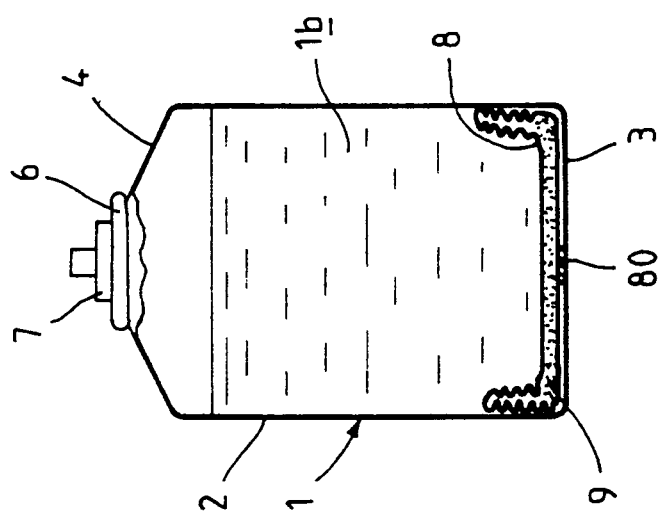
FIG. 2 shows an axial schematic cross-section of the container of FIG. 1 after the introduction of the fluid to be distributed and after the closing of its free end.
Figure 3:
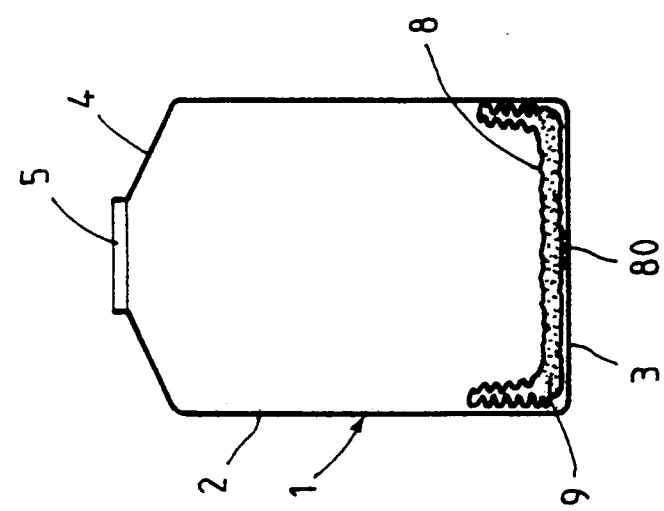
FIG. 3 shows an axial schematic cross-section of the container of FIG. 2 while the fermentation is developing and ensuring the production of carbon gas is the flexible pocket, with the pressurization taking place but the distribution not having begun.

Referring to FIGS. 1 to 3, it can be seen that the designation 1 refers to the overall exterior envelope of a packing container 1a in accordance with a first embodiment of the invention. This envelope has a generally cylindrical shape, in which lateral wall 2 is fixed to a base 3, for example, by seating. The upper part 4 of the exterior envelope has been subjected to a forming operation which has rendered it conical. The high end of said upper part 4 has an opening 5, which, at least after introduction of the pressure-inducing means described below, will be blocked by means of a valve-bearing cap 6 which is seated on the free edge of part 4 and comprises, in its central area, a valve 7 providing the distribution of the packed fluid and, as appropriate, the introduction of said fluid inside the packing container. The container 1a used has a capacity of 200 $cm^3$.

The chamber contained inside packing container 1a is a flexible pocket 8, which is produced in a sheet material, is gas-tight and is inert with regard to the fluid to be distributed, for example in polyethylene or a bi- or tri-layer material, with one of the layers being an aluminum film and the other layer or layers being a film of polyethylene or other suitable plastic material. Into this pocket is placed a fermentation system 9, composed of a sugar (saccharose or glucose), a yeast capable of ensuring the anaerobic fermentation of said sugar and, as appropriate, a doping agent composed of a vitamin (biotine or thiamine, for example), all in an aqueous medium. The selected flexible pocket 8 is capable of occupying a cylindrical volume of 220 $cm^3$ with the same shape as container 1a, such that the inflated pocket can occupy the whole interior of the container, and, consequently, ensure the removal of all the fluid to be distributed.

After introduction of the fermentation system 9, pocket 8 is soldered closed, so as to define a hermetically closed chamber. During the operation of closing the flexible pocket 8, at least a partial vacuum can possibly simultaneously be created inside said pocket, or indeed said pocket can be simultaneously compressed or deformed, such that the air trapped inside said pocket, after its closing, is at a pressure below atmospheric pressure.

The hermetically closed pocket 8 is then placed inside the exterior envelope 1 of container 1a through opening 6 (FIG. 1). Additional details relating in particular to the arrangement of pocket 8 inside the container can be found in FR-A-2 229 241. In the embodiment described, pocket 8 is assumed to be fixed at 80 to the bottom of the container so as to be able to inflate in the direction of the valve-bearing cap 6 of container 1a.

The product 1b to be distributed is then placed inside the container 1a, either directly through opening 5, with the container then being closed in a subsequent phase by means of the valve-bearing cap 6, or by means of valve 7, after said valve 7 has been fixed to the container by means of said valve-bearing cap 6 (FIG. 2).

Figure 5:
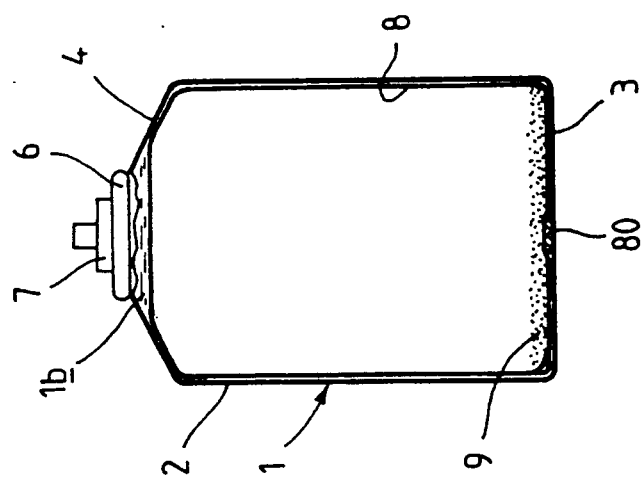
FIG. 5 shows an axial schematic cross-section of the container of FIG. 4 at the end of distribution.
Figure 4:
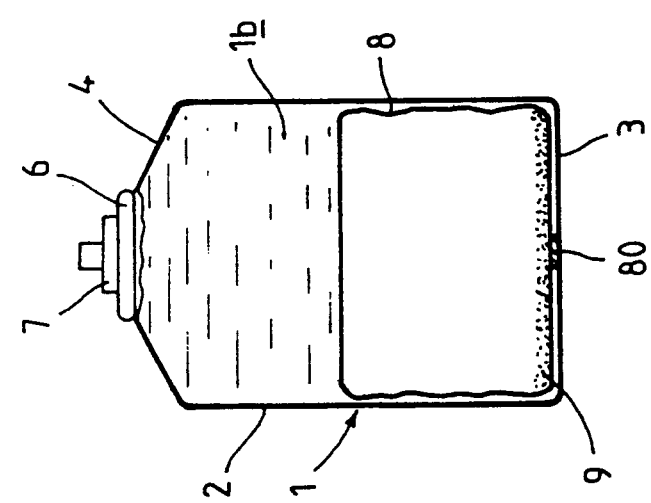
FIG. 4 shows an axial schematic cross-section of the container of FIG. 3 during the distribution of the packed product.

The carbon gas then begins to be released inside the pocket, which inflates, as is shown in FIG. 3. After approximately 24 hours, the carbon gas filling pocket 8 is under a pressure on the order of 2 to 8 bars, depending on the type and quantity of the fermentation system placed in pocket 8. As the distribution progresses, pocket 8 undergoes an expansion and occupies the volume left free by the ejected packed product 1b (FIG. 4). At the end of the distribution, pocket 8 occupies the entire interior volume of container 1a (FIG. 5).

Figure 6:
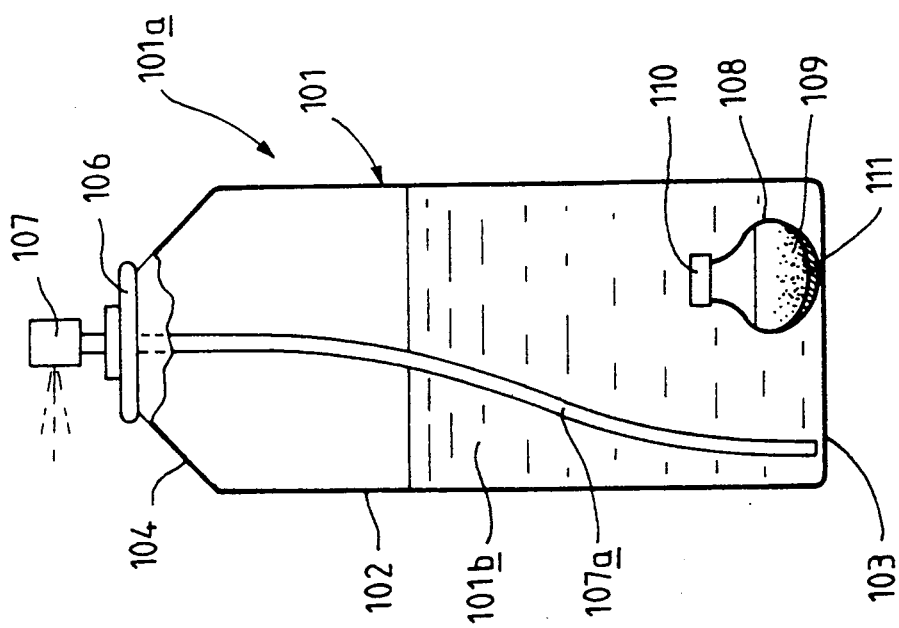
FIG. 6 shows an axial schematic cross-section of a container in accordance with a second embodiment of the invention, in which the carbon gas-producing fermentation system in accordance with the invention is placed in a small reservoir provided with a calibrated valve.

FIG. 6 shows schematically a packing container 101a in accordance with a second embodiment of the invention. The elements of container 1a, which are identical in container 101a, are designated in this second case by reference numerals greater by 100 than those used in said first case.

In this case, the flexible pocket 8 is replaced by a small rigid reservoir 108, which is also placed into container 101a before inserting the valve-bearing cap 106. This small reservoir 108 contains a starting fermentation system 109 of the same type as system 9. Reservoir 108, which has the general shape of a flask, is blocked by a valve 110, which is calibrated to open for a given difference in positive pressure ($\Delta P$), between the interior space of said reservoir 108 and that of the container 101*a*. In addition, opposite valve 110, reservoir 108, which is produced in a rigid material such as glass, metal or plastic, has a base 110 which is ballasted, for example using lead, such that, whatever the position of container 101*a*, the liquid phase of system 109, which is inside the reservoir 108, cannot escape through valve 110 when said valve is in the open position.

It can be chosen, for example, that valve 110 is calibrated to open only when the difference in pressure $\Delta P$ is 4 bars. When the fermentation develops inside system 109 and the pressure increases in reservoir 108, following the release of the carbon gas, the valve 110 opens as soon as the pressure in the reservoir 108 exceeds by 4 bars the pressure in container 101*a*. Initially, container 101*a* is at atmospheric pressure and valve 110 therefore opens when the absolute pressure in the reservoir 108 reaches 6 bars. The carbon gas created by system 109 therefore passes progressively into container 101*a*, in which the internal pressure increases while always remaining 4 bars less than that existing in reservoir 108. When valve 107 is pressed, an aerosol is obtained, which is a mixture of the fluid to be distributed and carbon gas; the pressure in container 101*a* decreases due to the distribution, which causes valve 110 to reopen; the interior of the container is recharged with carbon gas.

Figure 7:
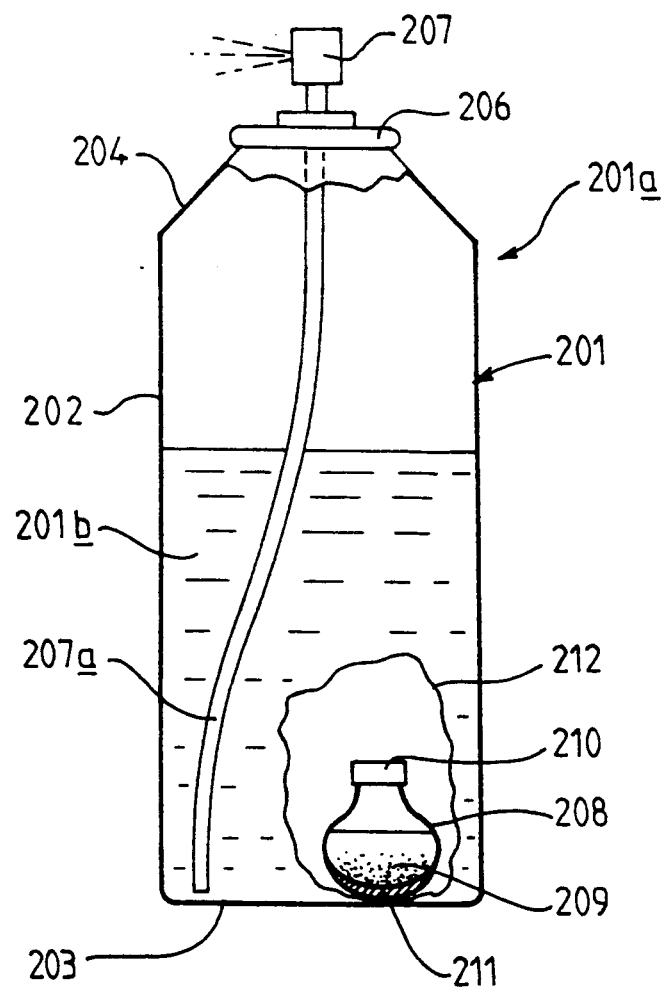
FIG. 7 shows an alternative of the second embodiment, in accordance with which the small reservoir provided with a calibrated valve is contained in a hermetically closed, flexible envelope.

FIG. 7 shows schematically a packing container 201*a* in accordance with a alternative of the second embodiment. The elements of container 101*a*, which are identical in container 201*a*, are designated by reference numerals which are greater by 100 than those used. In accordance with this alternative, the small reservoir 208, which contains a starting fermentation system 209, is contained within a flexible, resilient envelope 212 of the same type as that used in the first embodiment shown in FIGS. 1 to 5.

I claim:

1. A method for packing under pressure a liquid or pasty fluid intended to be distributed from a packing container (1*a*, 101*a*, 201*a*) provided with a distribution valve (7, 107, 207), with said fluid to be distributed (1*b*, 101*b*, 201*b*) being placed under pressure by means of a propulsive gas, in accordance with which method the propulsive gas is carbon gas obtained by anaerobic fermentation of a system (9, 109, 209) for fermentation of sugars using yeasts, with the components of said fermentation system (9, 109, 209) being selected qualitatively and quantitatively such that the carbon gas produced creates, inside the packing container (1*a*, 101*a*, 201*a*), a pressure capable of ensuring the distribution of the fluid (1*b*, 101*b*, 201*b*) by said valve (7, 107, 207), wherein the fermentation system is contained in a chamber (8, 108, 208) provided inside the container.

2. The method in accordance with claim 1, wherein simple sugars, such as glucose, and complex sugars, such as saccharose, in an aqueous medium can be used as the sugars.

3. The method in accordance with claim 1, wherein yeasts belonging to the Saccharomyces genus are used.

4. The method in accordance with claim 1, wherein at least one doping agent, selected in particular from among the vitamins, such as biotine and thiamine is added to the starting components of the fermentation system (9, 109, 209).

5. The method in accordance with claim 1, wherein, as the chamber in which the starting components of the fermentation system (9) are placed, a flexible pocket (8) is used, which is gas-tight and which is then hermetically closed, with said flexible pocket (8) being such that, once totally inflated, it is capable of occupying a volume at least equal to the internal volume of the packing container (1*a*).

6. The method in accordance with claim 1, enabling the distribution of liquid substances, wherein, as the chamber in which the starting components of the fermentation system (109) are placed, a small rigid reservoir (108) is used, which is normally closed by a valve (110), which is calibrated to open only when the pressure which is established in said reservoir (108) exceeds by a given amount that reigning in the interior space of the packing container (101*a*), with said reservoir (108) being ballasted so that the liquid phase of the fermentation system (109) is always beneath said valve (110), whatever the pressure of the packing container (101*a*).

7. The method in accordance with claim 6, wherein, as the chamber in which the starting components of the fermentation system (209) are placed, a small rigid reservoir (208) is used, which in turn is contained in a hermetically closed, flexible envelope (212).

* * * * *